(12) United States Patent
Addington

(10) Patent No.: US 9,250,067 B2
(45) Date of Patent: Feb. 2, 2016

(54) SYSTEM AND METHOD FOR EVALUATING THE PERFORMANCE OF A VEHICLE WINDSHIELD/WIPER COMBINATION

(71) Applicant: GLASSTECH, INC., Perrysburg, OH (US)

(72) Inventor: Jason C. Addington, Sylvania, OH (US)

(73) Assignee: Glasstech, Inc., Perrysburg, OH (US)

( * ) Notice: Subject to any disclaimer, the term of this patent is extended or adjusted under 35 U.S.C. 154(b) by 0 days.

(21) Appl. No.: 14/208,944

(22) Filed: Mar. 13, 2014

(65) Prior Publication Data

US 2014/0270391 A1    Sep. 18, 2014

Related U.S. Application Data

(60) Provisional application No. 61/793,578, filed on Mar. 15, 2013.

(51) Int. Cl.
*G01B 11/30* (2006.01)
*G06T 7/00* (2006.01)

(52) U.S. Cl.
CPC ............. *G01B 11/303* (2013.01); *G06T 7/001* (2013.01); *G06T 2207/20056* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 3,947,131 A * | 3/1976 | Karl | B60J 1/20 250/341.8 |
| 6,262,410 B1 * | 7/2001 | Stam et al. | 250/208.1 |
| 6,392,218 B1 * | 5/2002 | Kuehnle | 250/208.1 |
| 6,975,390 B2 * | 12/2005 | Mindl | B60S 1/0844 356/213 |
| 2003/0069674 A1 * | 4/2003 | Stam et al. | 701/36 |
| 2005/0254688 A1 * | 11/2005 | Franz | 382/104 |
| 2007/0272884 A1 * | 11/2007 | Utida et al. | 250/573 |
| 2011/0285850 A1 * | 11/2011 | Lu et al. | 348/148 |
| 2012/0098959 A1 | 4/2012 | Addington | |
| 2013/0076241 A1 * | 3/2013 | Schofield et al. | 315/82 |
| 2013/0158796 A1 * | 6/2013 | Higgins-Luthman | 701/36 |
| 2013/0208120 A1 * | 8/2013 | Hirai et al. | 348/148 |

* cited by examiner

*Primary Examiner* — Shervin Nakhjavan
(74) *Attorney, Agent, or Firm* — Brooks Kushman P.C.

(57) ABSTRACT

A system and method for evaluating the performance of a vehicle windshield wiper system includes a digital camera positioned to allow the camera to capture an image of the surface of the windshield, and a computer including logic for capturing a digital image of the surface of the soiled windshield, capturing a digital image of the surface of the wiped windshield, and comparing the data from both captured images to develop selected indicia related to the extent to which the soil has been removed from the windshield.

4 Claims, 4 Drawing Sheets

SYSTEM AND METHOD FOR EVALUATING THE PERFORMANCE OF A VEHICLE WINDSHIELD/WIPER COMBINATION

CROSS-REFERENCE TO RELATED APPLICATIONS

This application claims the benefit of U.S. provisional application Ser. No. 61/793,578 filed Mar. 15, 2013, the disclosure of which is hereby incorporated in its entirety by reference herein.

TECHNICAL FIELD

This invention relates to a method and system for evaluating vehicle windshield/windshield wiper operation utilizing digital image data acquisition and analysis techniques.

BACKGROUND

Automotive windshields are produced in a variety of sizes and shapes. When installed in a vehicle, the windshield is matched with one of an equally wide variety of sizes and types of windshield wiper systems, the purpose of which wiper systems is to quickly and effectively remove rain, snow, dust, and dirt, as well as any other liquid or solid materials that end up on the windshield surface.

It is therefore desirable to evaluate the operational effectiveness of a windshield/wiper combination. This evaluation may be conducted in connection with the design and evaluation of a particular windshield shape, a particular windshield wiper system design, as well as the suitability of the combination of a particular windshield and wiper system.

In addition to design evaluation, it may be desirable to conduct windshield/wiper system evaluations as part of product quality control to evaluate windshield/wiper system performance over time. Similarly, such evaluations may be a useful part of the vehicle assembly inspection process.

It is therefore desirable to develop an effective and efficient system and method for evaluating the performance of windshield/wiper systems.

SUMMARY

The disclosed system and method provide the capability to quickly and comprehensively assess the performance of a windshield/wiper system. In particular, in one embodiment, the disclosed system and method acquire an image of the surface of the windshield in a soiled condition and download the digital data corresponding to that image to a computer. After the windshield wipers are operated for a predetermined period, another image of the windshield surface is acquired and the image data again is downloaded to the computer. The image data for each of the "soiled surface" and the "wiped surface" are analyzed to identify and locate foreign objects/material on the windshield surface. The data for the two images is also compared to determine the extent to which the identified unwanted objects/materials have been wiped from the windshield surface.

The system further includes a digital camera which is mounted such that the windshield and wiper assembly are in the path of a digital camera so that it may be activated to capture the above-described series of images of the windshield surface. The system also includes a computer that is suitably programmed to acquire the digital images recorded by the camera and process the corresponding data according to the method further described hereinafter to analyze the windshield surface images and provide statistical and graphical indicia relevant to the evaluation. The disclosed system may also include a glass stand which receives, and upon which is mounted, the windshield and wiper assembly which is to be evaluated.

The disclosed method includes developing an intensity map for each of the acquired images from the image data associated with the acquired images, and analyzing the intensity map to identify and locate objects/material on the windshield surface for each image. In one embodiment, the disclosed method includes the step of subtracting the intensity map corresponding to the "soiled surface" image from the intensity map corresponding to the "wiped surface" image to evaluate to the extent to which the unwanted objects/materials have been removed by the wiper(s).

The above aspects of the disclosed system and method, as well as other aspects, will be better understood in view of the attached drawings and the following detailed description of the illustrated embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosed system and method, as further described hereinafter, utilizes digital image analysis methods to compare data that corresponds to a gray-scale image of the windshield surface for each of selected number of images of the windshield at various selected stages of windshield wiper operation. By mathematically analyzing the developed image data foreign objects located on the windshield surface (deposits) can be identified and compared with deposits on the windshield surface at different stages during wiper operation. More particularly, the deposits on the surface of the windshield can be developed and identified from the digital image of the windshield by isolating and analyzing, respectively, the magnitude component of the inverse Fourier transform of the data (also referred to as the "intensity map") acquired from a single digital image of the windshield.

Figure 1:
FIG. 1 is a graphic depiction of the result of the intensity map analysis conducted on an image of a clean, dry, sample windshield.

FIG. 1 depicts a graphic representation of the windshield generated from the intensity map developed from an image of a clean, dry, sample windshield. It should be noted that the dark gray marks in the upper right corner are indications of distortion resulting from the fabrication of the windshield. These identified defects can be mathematically "subtracted" from the analysis. The image depicted in FIG. 1 may be used as the "before image" that will function as the reference for the disclosed wiper performance evaluation.

After obtaining the analysis shown in FIG. 1, the left side of the windshield was then sprayed with a salt solution and allowed to dry. This was done to simulate dirt that might collect on the windshield surface during normal use. To simulate poor wiper function, the right side of the windshield was sprayed with windshield cleaner and wiped lightly with a used commercial windshield wiper blade. The unprocessed camera image of the soiled windshield is shown in FIG. 2.

Figure 2:
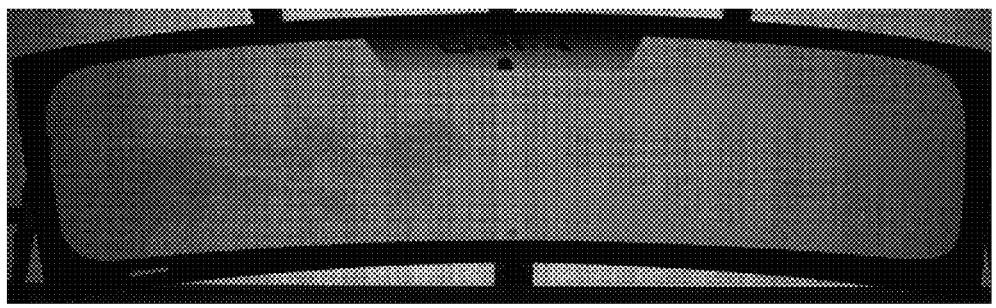
FIG. 2 is an unprocessed camera image of a windshield with dried salt spray (left) and poor wiping (right)
Figure 3:
FIG. 3 is a graphic depiction of the result of the intensity map analysis conducted on the image of FIG. 2.

The disclosed image analysis was then performed on the image data corresponding to the camera image displayed in FIG. 2. FIG. 3 depicts the results of the analysis performed on the data corresponding to the image displayed in FIG. 2. The image data displayed in FIG. 3 will serve as the "after" image in this exemplary evaluation.

Figure 4:
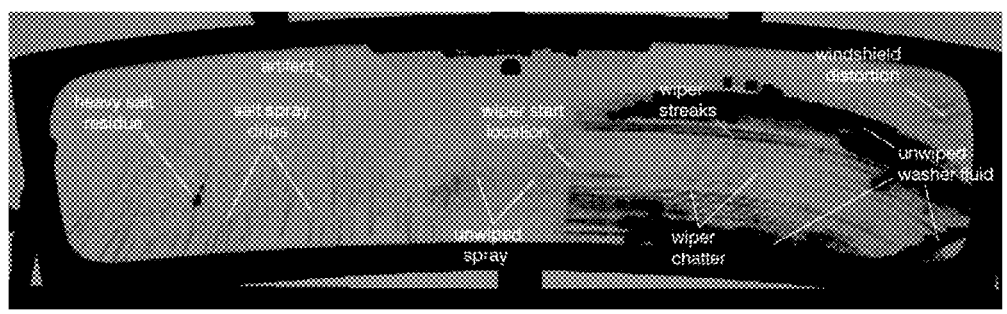
FIG. 4 is the graphic depiction of FIG. 3 with further identification of features identifiable from the analysis.

FIG. 4 includes an annotation describing the deposits identified after analyzing the image shown in FIG. 2. Note that blobs and streaks corresponding, respectively, to salt residue and spray drips may be identified from an analysis of the intensity map of the image data corresponding to the image shown in FIG. 2, and depicted on the graphic representation of the intensity map (shown in FIG. 4). Other deposits identified through the analysis included un-wiped spray, a detection of the border of the wiper start location, wiper streaks, wiper chatter marks, and unwiped washer fluid. It should also be noted that the windshield distortion identified in the analysis of the image of the clean windshield, is again identified and depicted in FIG. 4. Again, it should also be noted that indicia of distortion or other marks or defects discovered in the clean windshield image ("background features") may be "subtracted out" of the evaluation, if desired, to prevent inaccurate wiper performance evaluation.

Figure 5:
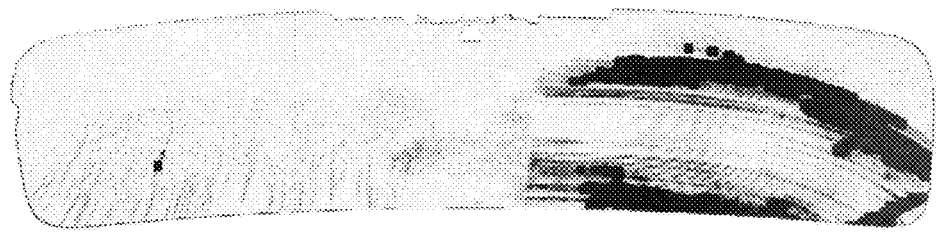
FIG. 5 is a graphic depiction of the difference between the intensity maps corresponding to the images of FIG. 2 and FIG. 3.

For example, as illustrated in FIG. 5, the background features found in the "before" analysis of the clean windshield image of FIG. 1 were subtracted from the "after" analysis of FIG. 3 to yield a "difference" image which does not include the features of the clean windshield, such as the vertical artifact line on the left side, and the distortion marks in the upper right corner, of the windshield. As a result, as shown in FIG. 5, inherent distortions and defects present in the windshield and irrelevant to windshield/wiper analysis have been eliminated from the "before and after" comparison developed from the intensity maps for each of, respectively, the soiled and poorly wiped windshield images.

Thus, as is evident from a review of FIGS. 1-5, the disclosed method can accurately identify surface regions indicating ineffective wiper function and distinguish these regions from background features in the windshield.

In addition to the graphical depictions illustrated in FIGS. 3-5, the system may be programmed to develop and display statistical information relating to the evaluation, including, for example, indicators of the frequency of certain categories of types of problems resulting from poor wiper function. Similarly, numerical or graphical standards which quantify the level of wiper performance may be developed and displayed, if desired.

Figure 6:
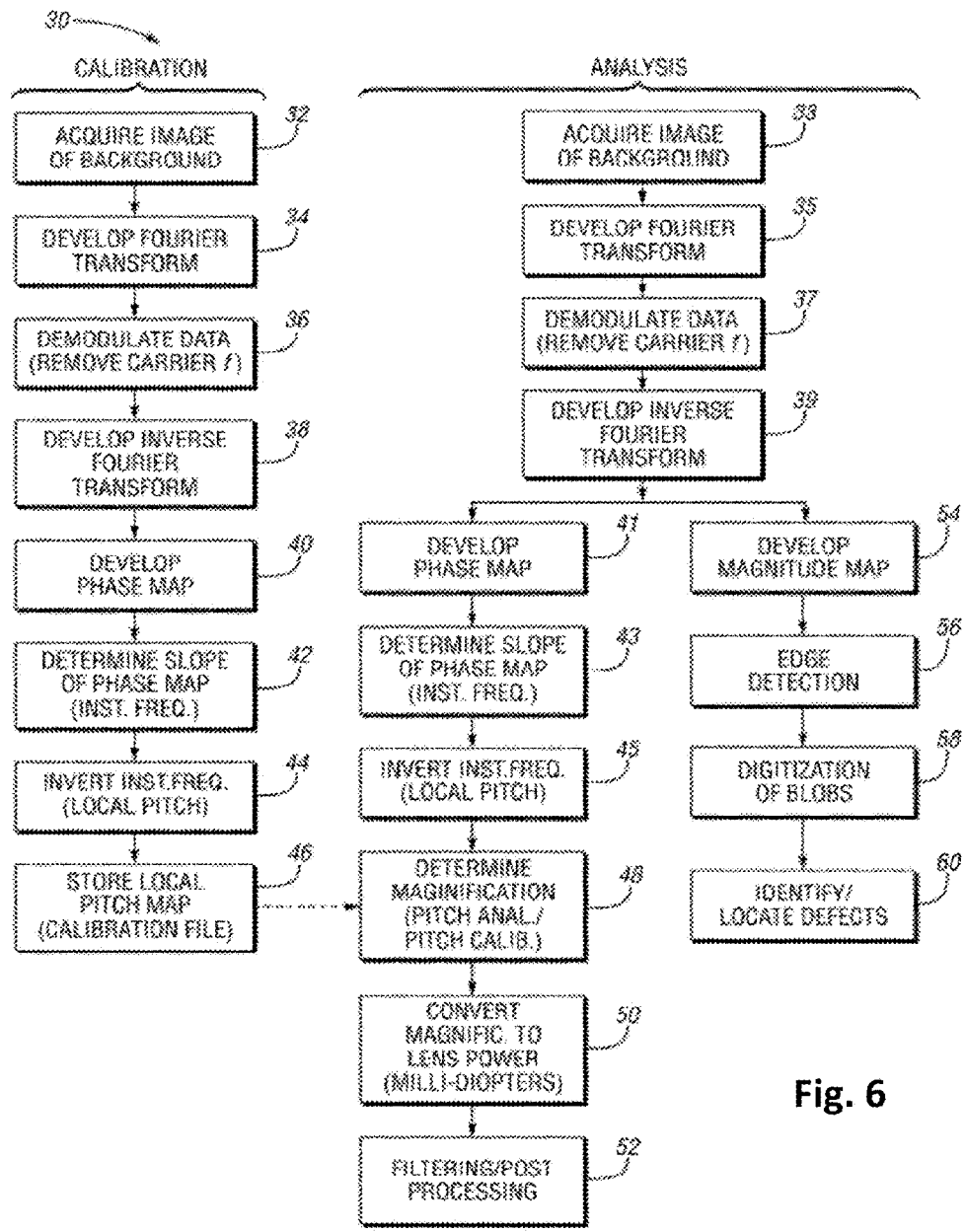
FIG. 6 is a flowchart of the disclosed method.

The analysis for each desired windshield image is illustrated in greater detail at the following described steps shown in FIG. 6. Once the windshield is mounted for analysis, an image of the windshield is acquired, at 33, using a CCD camera with the subject windshield positioned to allow the camera to capture an image of the windshield surface. The resolved image data is then processed as further described below to identify and locate the objects/materials visible on the surface, as well as develop the intensity map difference indicative of the extent to which the operation of the wipers has "wiped" the soiled windshield.

Still referring to FIG. 6, at 35, a Fourier transform of the acquired calibration image data is developed. The resulting data is modulated by the fundamental frequency of the grid pattern on the screen in both the horizontal and vertical directions. The bandwidth is narrowed to eliminate unwanted signal data such as second harmonics. At 37 the transformed data is demodulated, to remove the carrier frequency. An inverse Fourier transform of the demodulated data is then developed, at 39, with the resulting data yielding a two-dimensional complex number associated with each pixel having a phase component and a magnitude component.

Still referring to FIG. 6, the inverse Fourier transform of the magnitude component of the complex number, developed at 39, is further developed, at 54, to yield data corresponding to an intensity (or magnitude) map of the image. This is accomplished by determining the square root of the sum of the squares of the imaginary portion of the two-dimensional complex number and the real portion of the two-dimensional complex number for each pixel in the image. An example of this intensity map, shown in FIG. 3, is similar to a gray-scale image of the glass sheet illuminated by a point source of light, including intensity discontinuities corresponding to optical or obstructive defects on the glass sheet, including deposits drips spray marks, and streaks deposited on the windshield (hereinafter collectively referred to as deposits).

A further detailed description of other aspects of the image data acquisition and analysis which may be utilized in the disclosed method may be found in US Patent Application Publication No. 2012/0098959 A1, assigned to Glasstech, Inc., the assignee of the present application, directed to a "METHOD AND APPARATUS FOR MEASURING TRANSMITTED OPTICAL DISTORTION IN GLASS SHEETS". In particular, the portions of the disclosure found in the referenced application publication relating to system calibration, resolving the image data, and developing the intensity map, as well as other portions found pertinent to the present disclosure, are incorporated herein.

This intensity map is analyzed, at 56, using conventional edge detection algorithms to locate the edges of the deposits. One type of edge detection algorithm that may be used for this purpose is the Canny algorithm. Once the edges of the deposits are detected, all deposits which satisfy a predefined size threshold are then digitized, at 58, to identify the centers of these selected deposits. The typical "deposits" desired to be identified corresponds to deposits ranging in diameter from about 10 to about 300 pixels. The predefined defect size may be specified by the system user. For example, one size range has been set to 10-200 pixels. Each of the deposits satisfying the predefined criteria are located at 60. The location of each of these visible surface deposits may then be displayed on a windshield image displayed by the system. Surface deposits as small as 1 mm may be detected using this analysis.

Thus, the deposits, including, for example, any water, dirt, or other liquid or solid materials that may be deposited on the surface of the windshield, can be developed and identified for a particular windshield by isolating and analyzing, respectively, the magnitude component of the inverse Fourier transform of the data acquired from a single digital image of the windshield.

Figure 7:
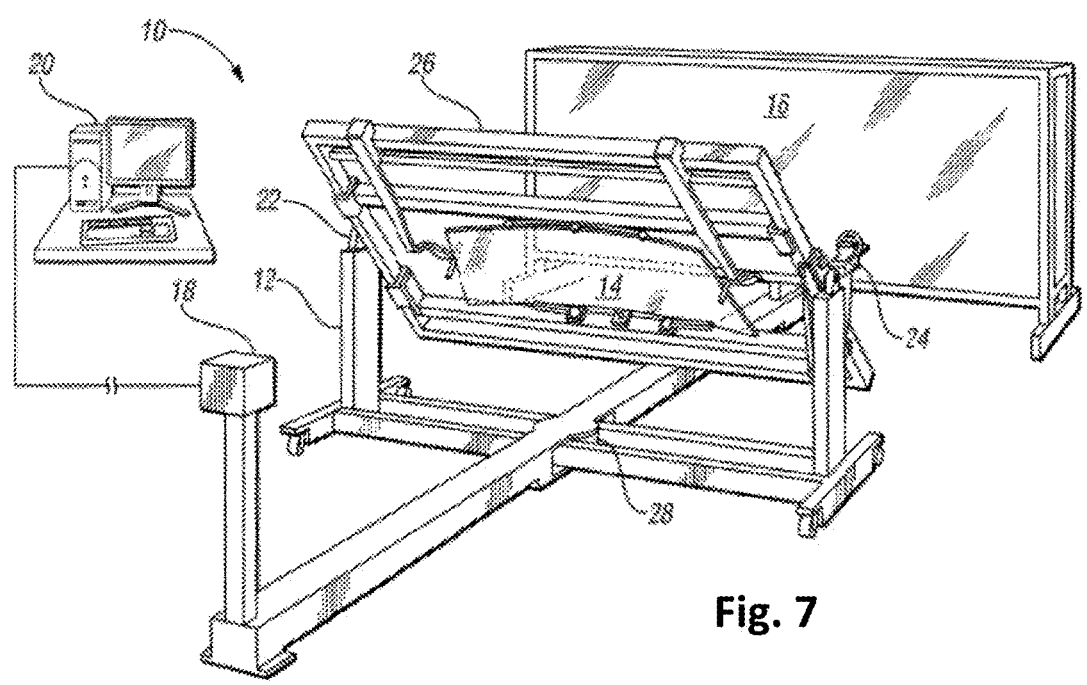
FIG. 7 is a perspective view of one embodiment of the disclosed system.

Referring to FIG. 7, in one embodiment, the system 10 includes a glass stand 12 for mounting a glass sheet 14 between a contrasting pattern displayed on a background screen 16 and a digital camera 18. The digital camera 18 is operatively connected to a conventional computer 20 to facilitate periodic downloading of image data for processing and analysis according to the disclosed method.

The digital camera 18 is mounted to collect images of the grid on screen 16 transmitted through the glass sheet 14 mounted on the glass stand. In one embodiment, the digital camera is a commercially available 12.8 MPa SLR-type camera. In another embodiment of the invention, a 16 MPa, 3 frame-per-second GE4900 model CCD camera, available from Prosilica, Inc. of Burnaby, British Columbia, Canada, may be employed as the camera.

The camera 18 is connected via a conventional data line to a computer 20 which is suitably programmed to acquire the digital image data from the camera, process the image data to obtain the desired resolution for the data, and analyze the data to develop the windshield surface deposit information according to the method of the present invention as further described herein. The computer is also programmed to present the derived information in both graphical (e.g., color-coded images) and statistical forms, as may be desired by the user.

In the embodiment shown in FIG. 7, the system 10 is provided as a stand-alone product which may be located in an engineering laboratory or production environment. Other contemplated embodiments of the system 10 include in-line installations in vehicle assembly plants, whereby the windshield/wiper performance evaluation may be conducted as the vehicle progresses through the assembly process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for evaluating the performance of a vehicle windshield wiper mounted in an operational position on a soiled windshield, the method including:
    capturing a digital image of the surface of the soiled windshield,
    operating the windshield wiper,
    capturing a digital image of the surface of the wiped windshield,
    comparing the data from both captured images to develop selected indicia related to the extent to which the soil has been removed from the windshield, including developing an intensity map for each of the acquired images from the image data associated with the acquired images and subtracting the intensity map of the first acquired image from the second acquired image.

2. The method of claim 1 wherein each intensity map is developed from the image data for each image by developing a Fourier transform of the captured image data, de-modulating the Fourier transform, developing an inverse Fourier transform of the de-modulated data, yielding a two-dimensional complex number associated with each pixel, said complex number having a phase component and a magnitude component, and developing an intensity map of the inverse Fourier transform by determining the square root of the sum of the squares of the imaginary portion of the two-dimensional complex number and the real portion of the two-dimensional complex number for each point of interest in the image.

3. A system for evaluating the performance of a vehicle windshield wiper mounted in an operational position on a soiled windshield, the method including:
    a digital camera positioned to allow the camera to capture an image of the surface of the windshield, and
    a computer including logic for capturing a digital image of the surface of the soiled windshield, capturing a digital image of the surface of the wiped windshield, and comparing the data from both captured images to develop selected indicia related to the extent to which the soil has been removed from the windshield, including developing an intensity map for each of the acquired images from the image data associated with the acquired images and subtracting the intensity map of the first acquired image from the second acquired image.

4. The system of claim 3 wherein the logic for developing an intensity map from the image data associated with the acquired images includes logic for developing a Fourier transform of the captured image data, de-modulating the Fourier transform, developing an inverse Fourier transform of the de-modulated data, yielding a two-dimensional complex number associated with each pixel, said complex number having a phase component and a magnitude component, and developing an intensity map of the inverse Fourier transform by determining the square root of the sum of the squares of the imaginary portion of the two-dimensional complex number and the real portion of the two-dimensional complex number for each point of interest in the image.

* * * * *